United States Patent
Misawa (10) Patent No.: US 7,057,661 B2
(45) Date of Patent: Jun. 6, 2006

(54) IMAGE-CAPTURING APPARATUS WITH RECEPTACLE AND LID

(75) Inventor: Takeshi Misawa, Saitama-ken (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 690 days.

(21) Appl. No.: 09/791,896

(22) Filed: Feb. 26, 2001

(65) Prior Publication Data

US 2001/0017664 A1    Aug. 30, 2001

(30) Foreign Application Priority Data

Feb. 28, 2000    (JP)    ............... 2000-052552

(51) Int. Cl.
*H04N 5/225*    (2006.01)
(52) U.S. Cl. ................... 348/373; 348/231.99
(58) Field of Classification Search ............. 348/373, 348/374, 375, 376, 552, 231.99, 231.7; 439/140, 439/131, 135; 360/130.34, 99.02
See application file for complete search history.

(56) References Cited

U.S. PATENT DOCUMENTS 4,797,761 A  *  1/1989  Cocco ............... 360/99.06
5,035,633 A  *  7/1991  Kobayashi et al. ......... 439/140
5,815,201 A  *  9/1998  Hashimoto et al. ......... 348/552
5,907,354 A  *  5/1999  Cama et al. ............. 348/231.7
6,104,430 A  *  8/2000  Fukuoka ................ 348/552
6,163,344 A  *  12/2000 Kawamura et al. ......... 348/552
6,404,981 B1 *  6/2002  Kumagai et al. .......... 348/373
6,542,186 B1 *  4/2003  Uryu .................. 348/231.7
2001/0017664 A1* 8/2001  Misawa ................ 348/373
2002/0191089 A1* 12/2002 Ikeda ................. 348/231.7

FOREIGN PATENT DOCUMENTS

| JP | 02054388 A | * | 2/1990 |
| JP | 09107493 A | * | 4/1997 |
| JP | 10200805 A | * | 7/1998 |
| JP | 11143601 A | * | 5/1999 |
| JP | 2000165714 A | * | 6/2000 |

* cited by examiner

*Primary Examiner*—Aung Moe
(74) *Attorney, Agent, or Firm*—Sughrue Mion, PLLC

(57) ABSTRACT

A digital camera in which a personal telephone or a card type communication medium can be mounted, and which disables communication access to a recording medium in the camera, when the recording medium is being replaced with the communication medium. A lid a having a notch is provided in a receptacle or a slot and the notch is formed so as to prevent interference with a connector portion of a connection cable when a communication PC card is inserted in the receptacle or slot.

20 Claims, 9 Drawing Sheets

IMAGE-CAPTURING APPARATUS WITH RECEPTACLE AND LID

BACKGROUND OF THE INVENTION

1. Field of the Invention

The present invention relates to an image-capturing apparatus, particularly to an image-capturing apparatus such as a digital camera in which an image is recorded, as image data, on a recording medium.

2. Description of the Related Art

Generally, an image-capturing apparatus (for example, a digital camera) reads an image formed by a plurality of lenses, by means of an image reading device such as a CCD, and records the image, as image data, on a recording medium such as smart media or floppy disk. Further, a digital camera is provided with a lid so as to prevent intrusion of dust into a slot in which the recording medium is stored.

In such digital cameras, if the recording medium is removed from the main body of camera during recording or reading of image data, there is a risk that image data may be lost or that the recording medium may be damaged. Accordingly, the digital camera has conventionally been provided such that a power source is automatically shut off on opening of the lid, thereby preventing removal of the recording medium while data access to the recording medium is enabled. Further, the digital camera is adapted to give a warning when an operation of removing the recording medium is detected while data access to the recording medium is enabled, or to inhibit removal of the recording medium by mechanically locking the lid to the slot when data access to the recording medium is enabled.

In recent years, various corrections or image editing for image data recorded on a recording medium by a digital camera and fetched into a personal computer has commonly been carried out. In general, in order to fetch image data from the recording medium on which the image data is recorded by the digital camera, into the personal computer, the recording medium is mounted on a PC reading card, the PC card is inserted into the personal computer, and the image data is fetched into the personal computer via the PC reading card.

It has recently been considered that when the image data is fetched from the digital camera into the personal computer, the digital camera is equipped with a card type communication medium to which a portable personal telephone (or PHS (personal handyphone system), hereinafter referred to as a personal telephone) is connected by a cable, a personal telephone in which a portion of a main body of the telephone serves as a card type communication medium, or a card type communication medium such as a PC card of the Bluetooth Standard or a modem card, and the image data is fetched into the personal computer by offline processing.

However, when the image data is fetched into the personal computer by offline processing, if the personal telephone in which a portion of the main body serves as the card type communication medium is mounted at the digital camera, the main body of the telephone protrudes from the main body of the digital camera. Further, when the card type communication medium connected to the personal telephone is mounted on the digital camera, the cable connected to the card type communication medium extends from the main body of the digital camera. Moreover, when the card type communication medium utilizing radio transmission such as a PC card of the Bluetooth Standard or a modem card, is mounted on the digital camera, an antenna provided in the card type communication medium protrudes from the main body of the digital camera.

As described above, in the digital camera, in order to prevent removal of the recording medium during reading, when opening of the lid of the slot is detected, a power source is automatically shut off. Alternatively, removal of the recording medium is inhibited by mechanically locking the lid of the slot when communication access to the recording medium is enabled. Therefore, if the lid is opened and the personal telephone or the card type communication medium is inserted in the slot, the lid provided in the slot cannot be closed by the above-described cable or the like. For this reason, the digital camera may stop driving or the recording medium may remain in an access inhibit state. As a result, the personal telephone or the card type communication medium cannot substantially be mounted on the digital camera.

Accordingly, it may be considered that restrictions based on an open/close state of the lid of the slot as described above may be removed or a structure having no lid for the slot may be provided. However, in this case as well, it is not possible to solve primary problems in that when the recording medium is inserted in the slot, image data may be lost or the recording medium may be damaged due to removal of the recording medium when communication access thereto is enabled, and when nothing is inserted in the slot, dust or waste matter may collect in the slot.

SUMMARY OF THE INVENTION

In view of the aforementioned, an object of the present invention is to provide an imaging apparatus in which a personal telephone or a card system communication medium can be mounted while preventing removal of a recording medium when data communication access thereto is enabled.

In order to the above-described object, a first aspect of the present invention is an image-capturing apparatus comprising a housing supporting lenses and an image reading element disposed for reading an image formed by the lenses and producing image data in accordance therewith for image recording, the housing including: a receptacle in which a first medium having a size which can be accommodated therein, and a second medium which can be inserted therein and of which portion protrudes from the receptacle when inserted, can be selectively inserted; and a lid member provided in a state of freely opening and closing so as to cover an opening of the receptacle, the lid member having a notch in which the portion of the second medium is inserted to pass when the lid member is closed in a state in which the second medium is inserted in the receptacle. Namely, this is an image-capturing apparatus for use with different kinds of media, the apparatus comprising: (a) a plurality of lenses disposed for forming an image; (b) an image reading system disposed for reading an image formed by the lens, and producing image data representing the image; and (c) a housing supporting the lenses and the image reading system, the housing including a receptacle for removably inserting a medium therein, the housing including a lid member movable between a closed position over the receptacle and an open position for removing and inserting the medium, the lid member including a notch through which a first medium does not protrude when fully inserted into the receptacle and the lid member is placed in the closed position behind the inserted medium, and a second medium which protrudes from the receptacle through the notch when the second medium is fully inserted in the receptacle and the lid member is placed in the closed position behind the inserted medium.

In the first aspect, the notch is formed in the lid member which covers the opening of the receptacle, and is provided in such a manner that, when the second medium is inserted in the receptacle, a portion of the second medium protruding from the receptacle is inserted to pass therethrough. For this reason, even if a portion of the second medium inserted in the receptacle protrudes therefrom, no possibility of the lid member being prevented from opening and closing by the protruding portion of the second medium arises, and the lid member can be closed. Accordingly, intrusion of dust or waste matter in the receptacle can be prevented.

Moreover, even when the second medium is inserted in the receptacle, not to mention when the first medium is inserted, the lid member can be closed. Therefore, the second medium, not to mention the first medium, is adapted to be made inaccessible for communication, unless the lid member is closed, thereby inhibiting an operation of removing the first medium or the second medium during communication access to the first medium or the second medium. Alternatively, a power source is adapted to be shut off if the lid member is opened. Naturally, the first medium or the second medium cannot be removed unless the lid member is opened. Therefore, a state in which the first medium or the second medium is removed by a user which does not notice ongoing access can be prevented.

The first medium and the second medium described in the present invention include any medium which can be inserted in the receptacle of the image-capturing apparatus, for example, a recording medium such as smart media or floppy disk, on which image data is recorded, and a communication medium used to communicate with external equipment, such as a personal telephone in which a portion of a main body serves as a card type communication medium, or a card type communication medium such as a PC card of the Bluetooth Standard or a modem card.

Preferably, when the first medium is inserted in the receptacle, or when the receptacle is empty, a structure for closing the notch, which will be described later, is provided. As a result, when the first medium is inserted in the receptacle, or when nothing is inserted in the receptacle, collection of waste matter or dust can be prevented.

For example, when nothing is inserted in the receptacle, a blocking member which engages with the notch to block the notch in a state in which the lid member is closed, or an engaging member which can be mounted at the first medium and engages with the notch in a state in which the lid member is closed, is used. When the first medium is inserted in the receptacle, the engaging member is mounted on the first medium and can be adapted to close the notch when the first medium is inserted in the receptacle. The first medium may be provided so as to have an engaging portion which engages with the notch in a state in which the lid member is closed.

Further, there may be applied another structure in which a covering member which covers the notch, is provided for the image-capturing apparatus. For example, a cloth-like member made of rubber or resin and having elasticity, or a bellows-shaped cloth-like member is formed, as the covering member, in the vicinity of the notch in a foldable manner and can be adapted so as to unfold only at the time of covering the notch. Further, a flat plate-shaped member is provided slidably in the vicinity of the notch and can be adapted so as to slide only when the notch is covered.

Further, in order to achieve the above-described object, a second aspect of the present invention is an image-capturing apparatus in which an image formed by lenses is read by an image reading element and is recorded as image data, comprising: a receptacle in which a first medium having a size which can be accommodated therein, and a second medium which can be inserted therein and of which portion protrudes from the receptacle when inserted, can be selectively inserted; and a lid member formed by a plurality of door portions which are each formed so as to be capable of opening and closing independently, and provided so as to cover an opening of the receptacle when the plurality of door portions are closed. Namely, this is an image-capturing apparatus for use with a medium, the apparatus comprising: (a) a plurality of lenses disposed for forming an image; (b) an image reading system disposed for reading an image formed by the lens, and producing image data representing the image; and (c) a housing supporting the lenses and the image reading system, the housing including a receptacle having an entrance for removably inserting a medium therein, the housing including a lid member for covering the receptacle entrance, the lid member including a plurality of door portions independently movable of one another, to closed and open positions, the doors substantially covering the receptacle entrance when all of the doors are in the closed position.

In the second aspect, since the lid member which covers the receptacle is formed by a plurality of door members which can be opened and closed independently of one another, only the door member provided at a position corresponding to a portion of the second medium protruding from the receptacle when the second medium is inserted in the receptacle is adapted to remain open with the other door members remaining closed. Accordingly, when the second medium is inserted in the receptacle, collection of waste matter or dust can be prevented. Preferably, a lock mechanism for holding a closed state of the door member is provided in each of the door members.

As a result, not only it is possible to prevent removal of the first medium or the second medium by a user which does not notice ongoing communication access, but also various kinds of second medium having different positions at which they protrude from the receptacle can be inserted in the receptacle. As a result, various kinds of first medium or second medium, namely, various kinds of recording medium or communication medium can be mounted in the image-capturing apparatus in a replaceable manner, and therefore, complete functions of the image-capturing apparatus are preferably enabled.

Moreover, in order to achieve the above-described object, a third aspect of the present invention is an image-capturing apparatus in which an image formed by lenses is read by an image reading element and is recorded as image data, comprising: a receptacle in which a first medium having a size which can be accommodated therein, and a second medium which can be inserted therein and of which portion protrudes from the receptacle when inserted, can be selectively inserted; and a lid member disposed so as to cover an opening of the receptacle, the lid member being provided which can be accommodated in an accommodating portion formed in a main body of the image-capturing apparatus along the receptacle. Namely, this is an image-capturing apparatus for use with different kinds of media, the apparatus comprising: (a) a plurality of lenses disposed for forming an image; (b) an image reading system disposed for reading an image formed by the lens, and producing image data representing the image; and (c) a housing supporting the lenses and the image reading system, the housing including a receptacle having an entrance for removably accommodating a medium, and when a first medium has been fully inserted into the receptacle the medium does not protrude from the entrance, and when a second medium has been fully inserted, the medium protrudes from the entrance, the housing including a recess extending along the receptacle, and a lid member positionable at an insertion position at least partially retracted into the recess, and a closed position extending from the recess and covering the receptacle entrance.

That is, when the first medium or the second medium is inserted in the receptacle, there is reduced risk of dust or waste matter collecting in the receptacle. Therefore, in the third aspect, when the second medium is inserted in the receptacle, that is, when the lid member cannot be closed, the lid member is accommodated in the accommodating portion without closing the receptacle. When the first medium is inserted in the receptacle, that is, when the lid member can be closed, the lid member is closed.

As a result, various kinds of second medium having different positions at which they protrude from the receptacle can be inserted in the receptacle, and various kinds of recording medium or communication medium can be inserted in the image-capturing apparatus in a replaceable manner. Therefore, complete functions of the image-capturing apparatus is preferably enabled. When the second medium is inserted, the lid member can be accommodated while preventing accumulation of waste matter or dust in the receptacle. Therefore, there is no possibility that the second medium be impeded by the lid member.

Preferably, a detector which detects a state of the lid member is further provided. A determination may be made, based on the state of the lid member detected by the detector, as to whether the second medium is inserted.

As a result, electrical control can be automatically carried out in accordance with the position of the lid member, thereby making it possible to reduce a time from when the recording medium or the communication medium is inserted in the receptacle to when processing corresponding to the inserted medium is started.

For example, when a state in which the lid member is accommodated in the accommodating portion is detected by the detector, it is determined that the second medium is inserted, and a driver for the second medium is read. Further, when a state in which the opening of the receptacle is covered by the covering member is detected by the detector, it is determined that the first medium is inserted, and a driver for the first medium is read.

Moreover, electrical control of the image-capturing apparatus can be provided so as to be altered in accordance with the state of the lid member in such a manner that: when a state in which the lid member is accommodated in the accommodating portion is detected by the detector, if an instruction for removal is given, communication access is forcedly brought to an end or a warning is given, such as sounding a buzzer; and when a state in which the opening of the receptacle is covered by the lid member is detected by the detector, even if an instruction for removal is given, the instruction may be ignored or removal processing is performed after completion of communication access.

BRIEF DESCRIPTION OF THE DRAWINGS

FIGS. 3A to 3C are partial perspective views showing a lid of a second preferred embodiment of digital camera according to the present invention.

FIGS. 6A and 6B are partial perspective views showing a lid of a third preferred embodiment of digital camera according to the present invention.

DESCRIPTION OF THE PREFERRED EMBODIMENTS

First Embodiment

Figure 1:
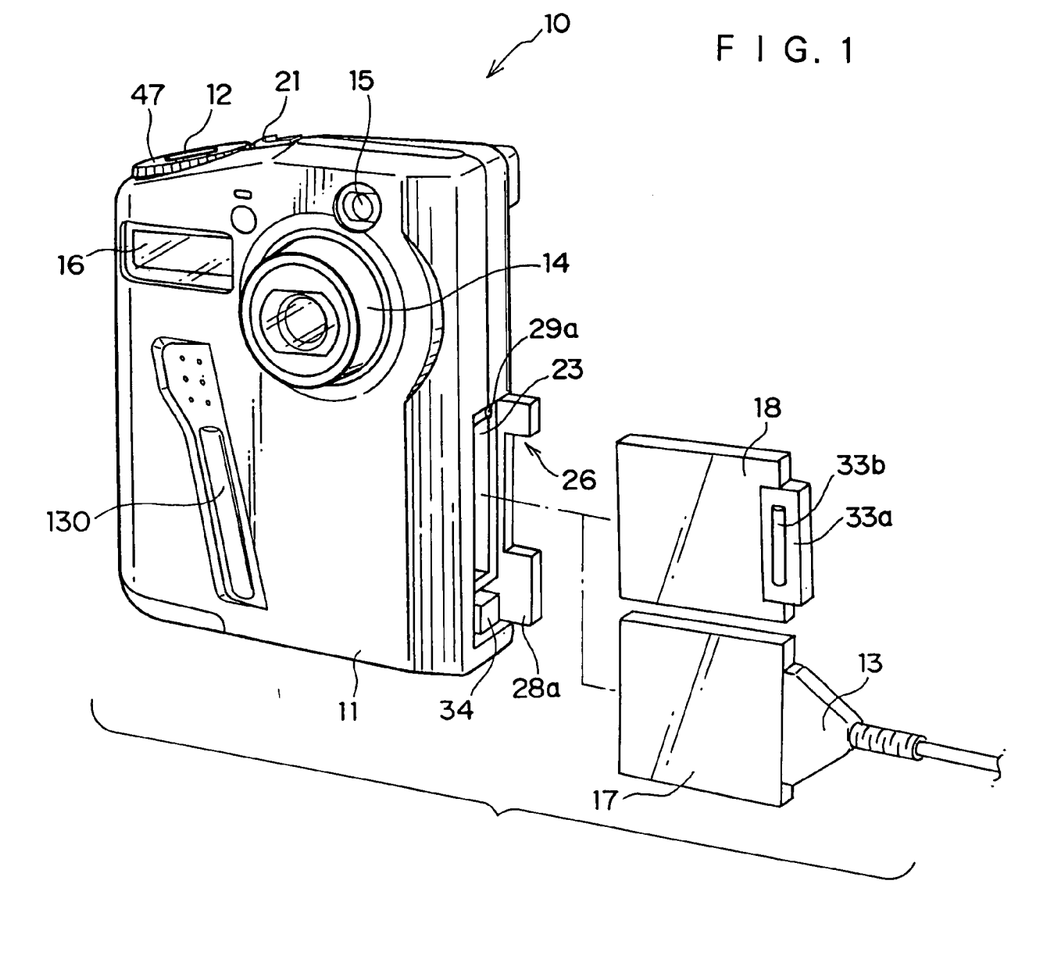
FIG. 1 is a perspective view of a first preferred embodiment of digital camera according to the present invention.

Referring now to FIG. 1, a first preferred embodiment according to the present invention will be hereinafter described in detail. A digital camera 10 to which the present invention is applied, is formed as shown in FIG. 1, in such a manner that a housing or main body 11 has a substantially box-shaped configuration and a protrusion (holding portion) 130 is formed at a left side of the digital camera when seen from the front so as to facilitate holding of the main body 11.

At the front side of the main body 11, as shown in FIG. 1, a zoom lens 14, a finder 15 showing a range to be photographed or the like, which is visually confirmed, and a flash 16 for emitting auxiliary light during a low illuminance are mounted.

Further, a mode dial 47 and a power switch 21 are provided on the upper surface of the main body 11 from left to right when seen from the front, and a central portion of the mode dial 47 is formed as a shutter button 12.

The mode dial 47 is a dial used to select an operation mode of the digital camera. For example, any one of the following is selected by the mode dial 47: automatic photographing mode, manual photographing mode, self-timer photographing mode, reproduction mode, PC mode for outputting an image with the camera being connected to a personal computer, and a setup item setting mode for setting initial conditions for various functions.

A color display 46 (see FIG. 2) comprised of liquid crystal display (LCD; not shown) is mounted at a lower side on a back surface of the housing or main body 11. Provided at the upper side of the display 46 are a monochrome liquid crystal display panel and various selection buttons such as a flash button, a cross button 19 (see FIG. 2), and a menu execution button 25 (see FIG. 2).

Figure 2:
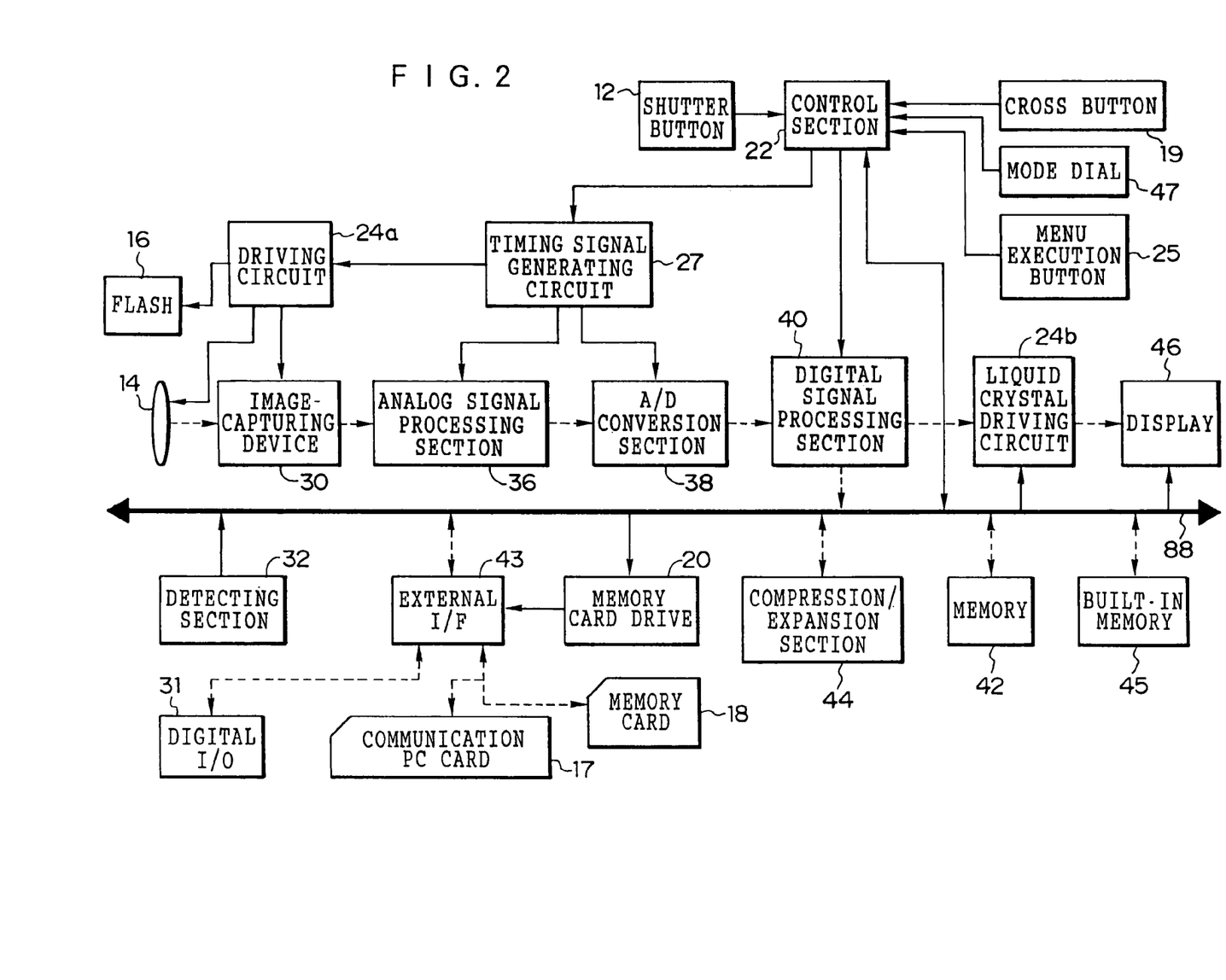
FIG. 2 is a block diagram showing an electrical structure of the digital camera shown in FIG. 1.

When an instruction for display of an image is given, the display 46 displays an image over the entire image plane thereof based on image data stored in a memory 42, which will be described later, or image data read from a memory card 18, or displays an arrangement of a plurality of reduced images (hereinafter referred to as thumb-nail representation), or displays a menu for selection of various functions. The liquid crystal display panel displays settings of the digital camera at the present time, such as operation mode, image quality, battery capacity, emission or non-emission of flash light, number of sheets available for photographing, and the like.

The cross button is a button which is used when the menu for selection of various items is shown on the display 46, for selecting a button shown on the display 46 or to operate a cursor. The flash button is a button used to give an instruction for forced emission of light when additional illumination is required, or to give an instruction for inhibition of emission of light. The menu execution button is a button used to give an instruction for execution of an item shown on the display 46 and selected by the cross button.

Further, a receptacle or slot 23 is provided at a right side surface of the main body 11 when seen from the front thereof, and any one of the memory card 18 serving as an information storage medium such as smart media, and a communication PC card 17 connected via a connection cable 13 to a personal telephone such as PHS and allowing transmission of image data by offline processing can be selectively inserted in the slot 23. The memory card 18 corresponds to a first medium of the present invention and the communication PC card 17 corresponds to a second medium of the present invention.

The receptacle or slot 23 is provided with an opening and closing lid 28a so as to prevent accumulation of waste matter therein, such as dust. The lid 28a includes a notch 26 which prevents interference with the connection cable when the communication PC card 17 is inserted in the slot 23. Further, an open/close-state detecting sensor 29a is provided in the vicinity of the slot 23. The open/close-state detecting sensor 29a is pressed and turned on when the lid 28a is closed, and outputs an electric signal to a detecting section 32, which will be described later, thereby detecting that the lid 28a has been closed.

In order to "close-up" the notch 26 of the lid 28a, in the present embodiment, a cap 33a comprised of a flexible member such as rubber or resin is removably mounted on the memory card 18. The cap 33a includes a convex portion 33b on each of both side surfaces thereof. The convex portion 33b is shaped so as to close-up the notch 26. Accordingly, when nothing is inserted in the slot 23, the cap 33a is removed from the memory card 18 and the convex portions 33b are fitted into the notch 26, thereby making it possible to close the notch 26. Further, when the memory card 18 is inserted in the slot 23, as shown in FIG. 1, the memory card 18 at which the cap 33a has been mounted in advance, is inserted in the slot 23, thereby making it possible to close the notch 26. Although the structure in which the cap 33a including the convex portions 33b is removably mounted at the memory card 18 is provided, the memory card 18 itself may be adapted so as to have the convex portions 33b formed thereon. When nothing is inserted in the slot 23, a covering member for covering the notch 26 may be provided in the digital camera 10. For example, a cloth-like member made of rubber or resin and having elasticity, or a bellows-shaped cloth-like member is formed, as the covering member, in the vicinity of the notch 26 in a foldable manner and adapted so as to unfold only at the time of covering the notch 26. Further, a flat plate-shaped member is provided slidably in the vicinity of the notch 26 and is adapted so as to slide at the time of covering the notch.

FIG. 2 shows an electrical structure of the digital camera 10. The zoom lens 14 is, specifically, a zoom lens (a variable-focal-length lens) including a mechanism which allows focusing by driving force of a driving source such as a stepping motor (automatic focusing (AF) mechanism). The AF mechanism and zoom mechanism of the zoom lens 14 are driven by a driving circuit 24a. The driving circuit 24a also controls so as to drive the flash 16 and an image-capturing device 30, which will be described later. Further, a fixed-focal-length lens including only the AF mechanism may be used in place of the zoom lens 14.

The image-capturing device 30 comprised of an area CCD and provided with an electronic shutter mechanism is disposed at a position corresponding to a focal position of the zoom lens 14 within the main body 11. Light reflected by a subject and made incident on the zoom lens 14 is made to form an image on a light receiving surface of the image-capturing device 30. The image-capturing device 30 stores charges corresponding to an amount of light to be made incident, in accordance with an exposure control value based on a photometric value measured in a photometer section (not shown), and outputs the stored charges, that is, an image signal to an analog signal processing section 36 via an amplifier (not shown).

The image-capturing device 30 is also driven by the driving circuit 24a. The driving circuit 24a drives the image-capturing device 30 at a timing synchronously with a timing signal generated by a timing signal generating circuit 27, and outputs an image signal (that is, a signal which represents an amount of received light in each of a large number of photoelectric conversion cells arranged in a matrix manner on the light receiving surface). The image-capturing device 30 corresponds to an image reading element of the present invention.

The timing signal generating circuit 27 is controlled by a control section 22 formed by a microcomputer, and generates various timing signals (clock signals) for actuating the image-capturing device 30, an A/D conversion section 38, and the like.

The analog signal processing section 36 effects predetermined analog signal processing (for example, noise reduction processing or the like) for an image signal outputted from the image-capturing device 30 and amplified by the amplifier, and outputs the image signal to the A/D conversion section 38. The A/D conversion section 38 converts the inputted analog signal to a digital signal and outputs the same to a digital signal processing section 40. The digital signal processing section 40 effects predetermined digital signal processing (for example, shading correction processing) for the inputted digital signal, and outputs the digital signal, as image data, to the memory 42 via a bus 88.

The memory 42 temporarily stores therein image data outputted from the digital signal processing section 40 via a data bus. At this time, if an instruction for writing in the memory card 18 is given, image data stored only when closing of the lid is detected by the detecting section 32, is compressed in a compression/expansion section 44 and is written via an external interface (external I/F) 43. The image data may also be adapted so as to be written without being compressed in the compression/expansion section 44.

Further, when an instruction for writing is given in a state in which the memory card 18 is not inserted in the slot 23, or when an instruction for writing is given in a state in which the communication PC card 17 is inserted in the slot 23, or when an instruction for writing to a built-in memory 45 is given, image data stored in the memory 42 is written to the built-in memory 45. At this time, the image data can be set so as to be written as compressed in the compression/expansion section 44 or to be written without compression. The external I/F 43 is provided with a digital input/output (I/O) port 31 so that the image data can also be outputted to other equipment connected to the digital I/O port 31.

When an instruction for reproduction (display) of an image based on image data stored in the memory card 18 inserted in the slot 23 or in the built-in memory 45 is given, image data is read out from the memory card 18 or from the built-in memory 45. When an image is read out from the memory card 18, the reading of an image is allowed only when closing of the lid is detected by the detecting section 32.

When the read image data has been compressed and stored, the compressed image data is expanded (decompressed) in the compression/expansion section 44, and thereafter, stored in the memory 42. The image data stored in the memory 42 is transferred by the digital signal processing section 40 to the liquid crystal driving circuit 24b, and an image is displayed (reproduced) on the display 46.

In the digital camera of the above-described embodiment, in either case in which the memory card 18 is inserted or the communication PC card 17 is inserted, the lid 28a can be closed. Accordingly, when the open/close-state detecting sensor 29a is pressed and turned on, and outputs an electric signal to the detecting section 32, thereby detecting that the lid 28a has been closed, access to the memory card 18 and the communication PC card 17 is allowed and the kind of the card inserted in the slot is determined, that is, it is determined whether the card is the memory card 18 or the communication PC card 17, due to access to the card inserted in the slot. Thereafter, processing corresponding to the determined kind of the card (writing or reading of image data into the memory card 18, or communication of image data via the communication PC card 17 (output of image data to other equipment)) can be performed. On the other hand, when closing of the lid 28a is not detected, the memory card 18 and the communication PC card 17 are made inaccessible for communication. For example, an instruction for writing and reading image data to or from the memory card 18, or an instruction for communication of image data via the communication PC card 17 (output of image data to other equipment) may be ignored.

Second Embodiment

A second embodiment of the present invention will be described in detail with reference to FIGS. 3A to 3C, FIG. 4, and FIGS. 5A and 5B. A digital camera of the second embodiment has almost the same structure as that of the first embodiment, and therefore, only different parts will be described.

The digital camera of the second embodiment is different from that of the first embodiment in the structure of a lid 28b of the slot 23. The lid 28b is formed so as to have a hinged structure as shown in FIGS. 3A to 3C.

That is, the lid 28b of the second embodiment includes a first member 34a provided so as to be slidable, in a depthwise direction, within an accommodating recess or groove 37 (see FIG. 4) formed along the slot 23, and a second member 34b provided so as to be rotatable with respect to the first member 34a. As shown in FIG. 3A, an opening of the slot 23 can be covered by rotating the second member 34b in a state in which the first member 34a is disposed at an uppermost position.

Figure 4:
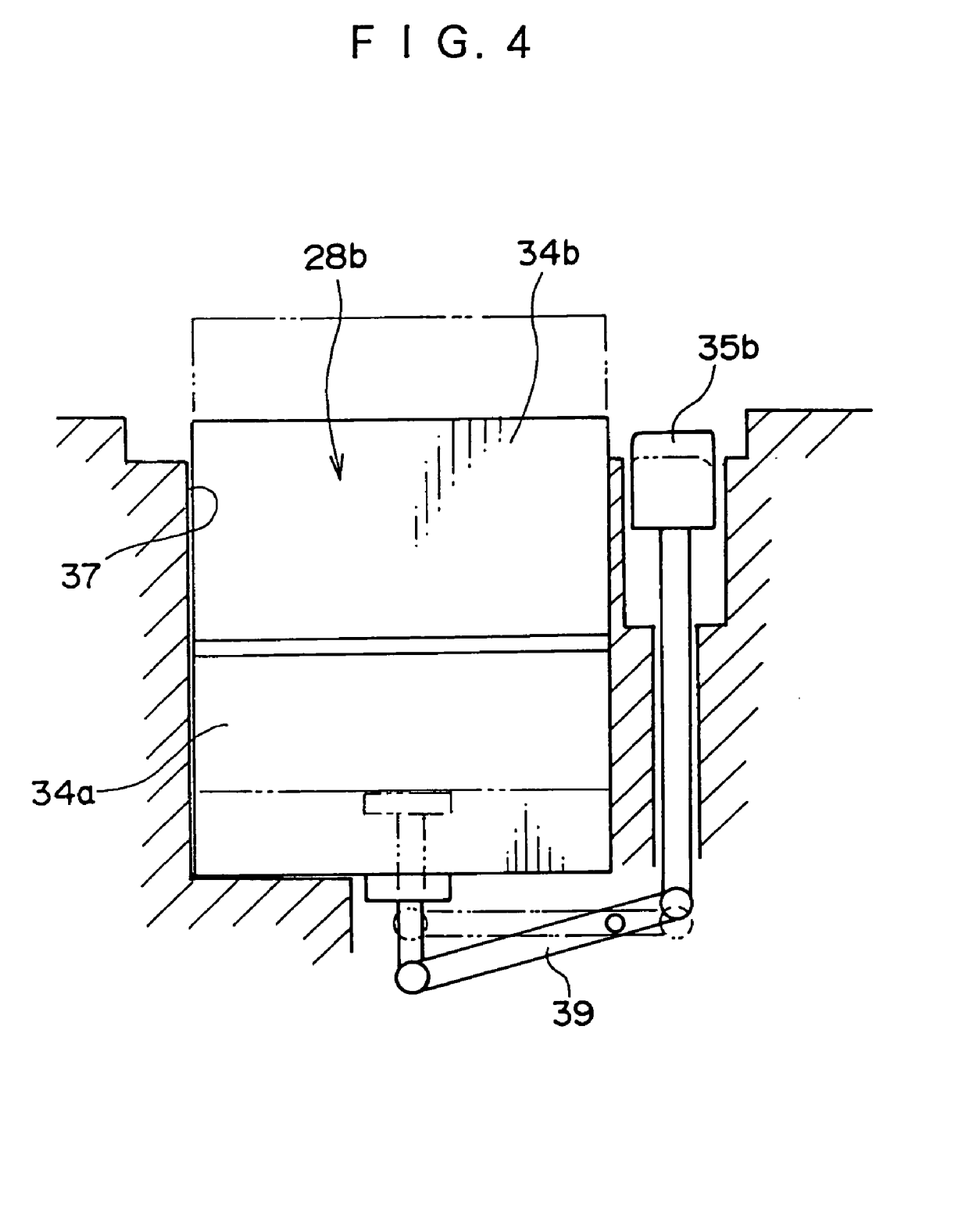
FIG. 4 is a diagram which illustrates a structure in which the lid shown in FIGS. 3A to 3C and a push-switch are connected.

The first member 34a is connected to a push-switch 35b provided adjacent to an ejection switch 35a in the vicinity of the slot 23. The push-switch 35b is, as shown in FIG. 4, supported by a stick member connected at one of ends of a bar-shaped lever 39 disposed within the main body 11. The lever 39 is provided so as to be swingable around a supporting point, and a supporting member for supporting the bottom of the first member 34a is connected at the other end of the lever 39.

Figure 3A:
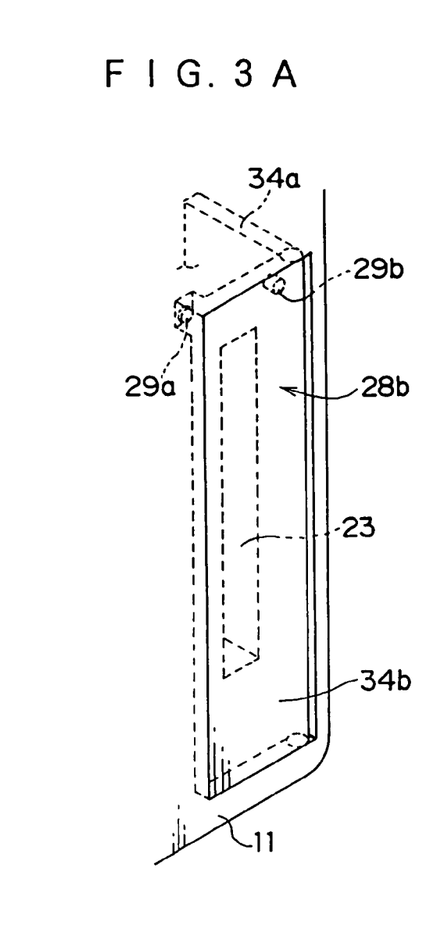
FIG. 3A is an illustrative view showing a state in which the lid is closed.
Figure 3B:
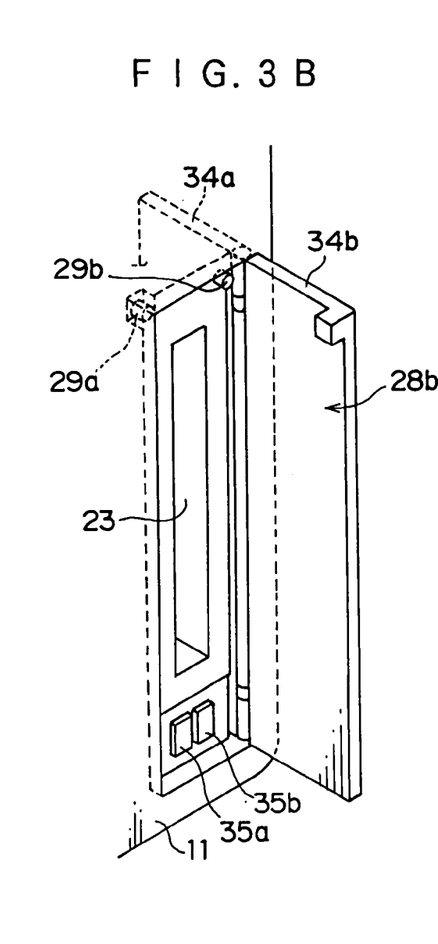
FIG. 3B is an illustrative view showing a state in which the lid is opened.
Figure 3C:
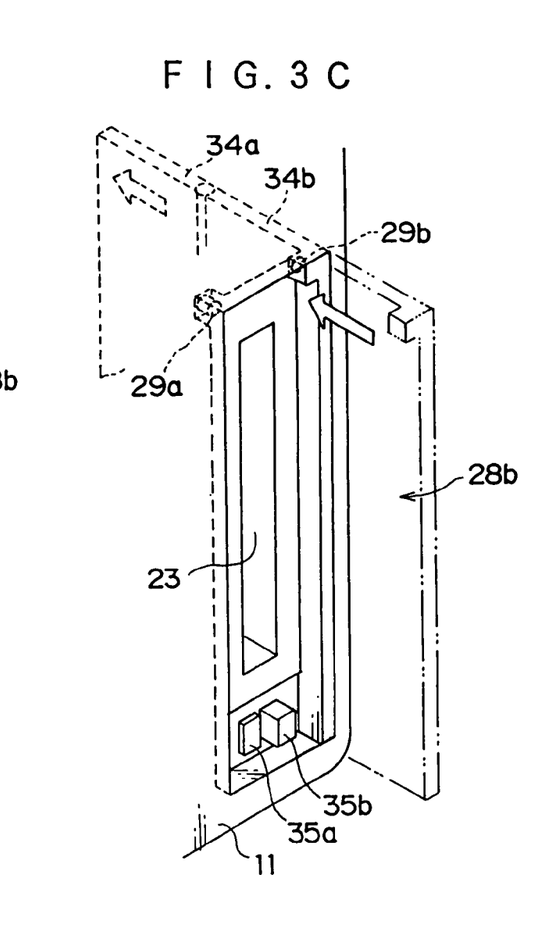
FIG. 3C is an illustrative view showing a state in which the lid is accommodated in a recess.

As shown in FIGS. 3A and 3B, in a state in which the first member 34a is disposed at an uppermost position, the push-switch 35b remains pushed-down. As shown in FIG. 3C, when the second member 34b is pushed in the accommodating groove 37 in a state of being opened substantially straight with respect to the first member 34a, the first member 34a is disposed at a bottommost position, and the push-switch 35b is protruded with the other end of the lever 39 being pushed down and the one end thereof being pushed up.

Accordingly, in a state in which the lid 28b can be closed, for example, when the medium inserted in the slot is formed so as not to protrude from the slot, or when nothing is inserted in the slot, the first member 34a is disposed at the uppermost position by depressing the push-switch 35b. Therefore, the second member 34b is allowed to be swingable and opening of the slot 23 is thereby closed. Due to provision of an engaging portion (not shown) which engages with the second member 34b in a releasable manner with respect to the main body 11 when the entrance or opening of the slot 23 is closed, it is possible to prevent the second member 34b from opening naturally.

For example, when the second member 34b is disposed so as to cover the opening of the slot 23, a substantially L-shaped engaging portion is formed, as the engaging portion as described above, in at least one of the main body 11 and the second member 34b so as to allow the second member 34b and the main body 11 to engage each other. Further, so long as an elastic member such as spring or rubber is provided so as to apply urging force to the second member 34b in a direction in which the second member 34b opens, the second member 34b is adapted to automatically open due to the urging force of the elastic member when it is released from being engaged by the engaging portion. Therefore, this structure is preferable.

The ejection switch 35a is a switch used to remove the media card such as the memory card 18 or the communication PC card 17. When the media card is inserted in the slot, the ejection switch 35a protrudes up due to a lever mechanism similar to the push-switch 35b. When the ejection button 35a is pushed, the media card is adapted to pop-up from the slot.

An open/close-state detecting sensor 29a and an accommodation detecting sensor 29b are provided in the vicinity of the slot 23. The open/close-state detecting sensor 29a and the accommodation detecting sensor 29b form a detector. The open/close-state detecting sensor 29a is disposed at the side of the slot 23 opposite to the side at which the lid 28b is provided, and at a position where it is pushed by a convex portion formed in the second member 34b when the second member 34b swings to cover the opening of the slot 23. When the open/close-state detecting sensor 29a is pushed, it is turned on and outputs an electric signal to the detecting section 32.

Further, the accommodation detecting sensor 29b is disposed at the side at which the lid 28b is provided with respect to the slot 23, and at a position where it is pushed by the second member 34b when the second member 34b is pushed and fixed in the accommodating groove 37. The accommodation detecting sensor 29b is, in the same manner as in the open/close-state detecting sensor 29a, pushed and turned on, and further outputs an electric signal to the detecting section 32.

Figure 5A:
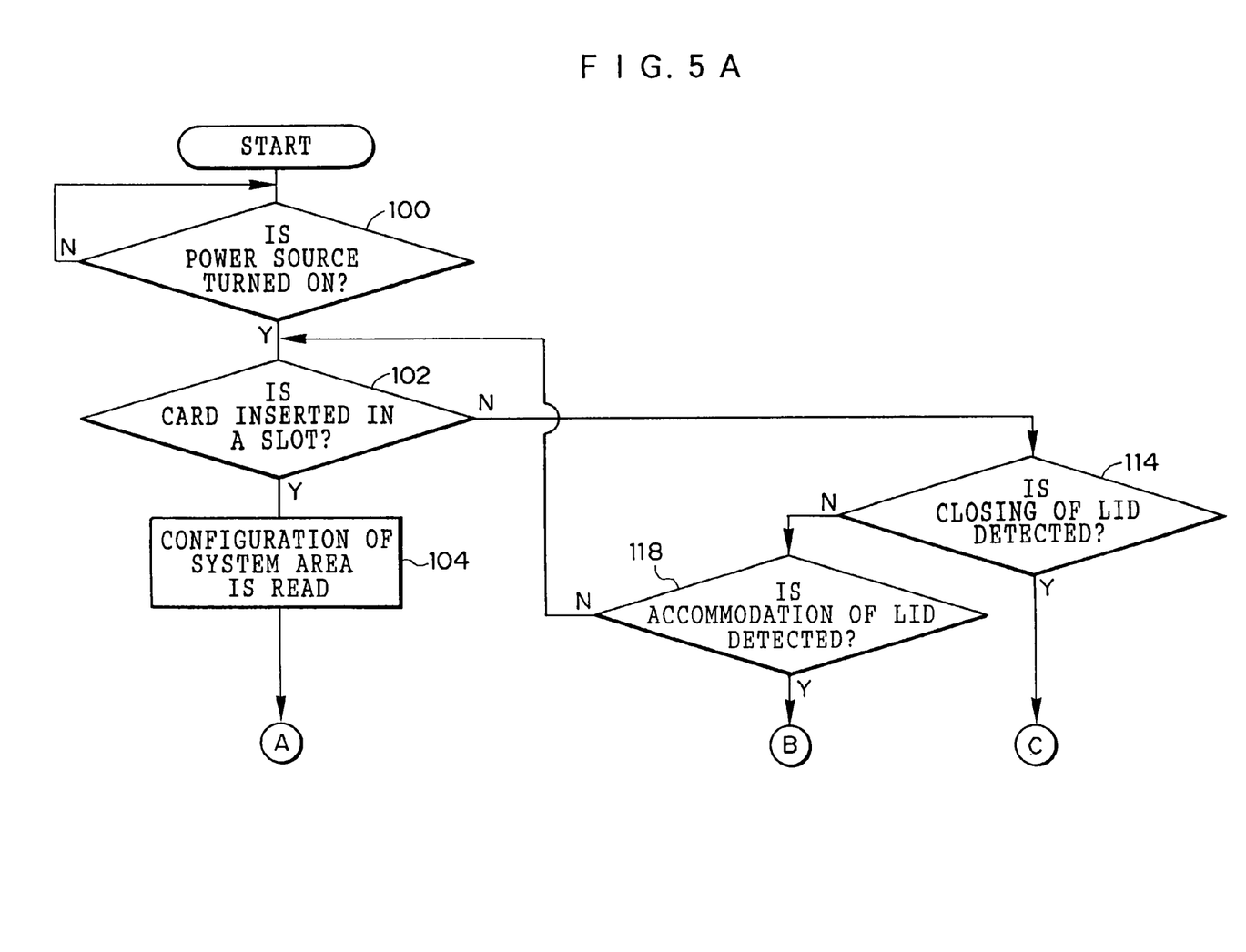
FIGS. 5A and 5B are flow charts showing control logic in a control section of the digital camera of FIGS. 3A to 3C.
Figure 5B:
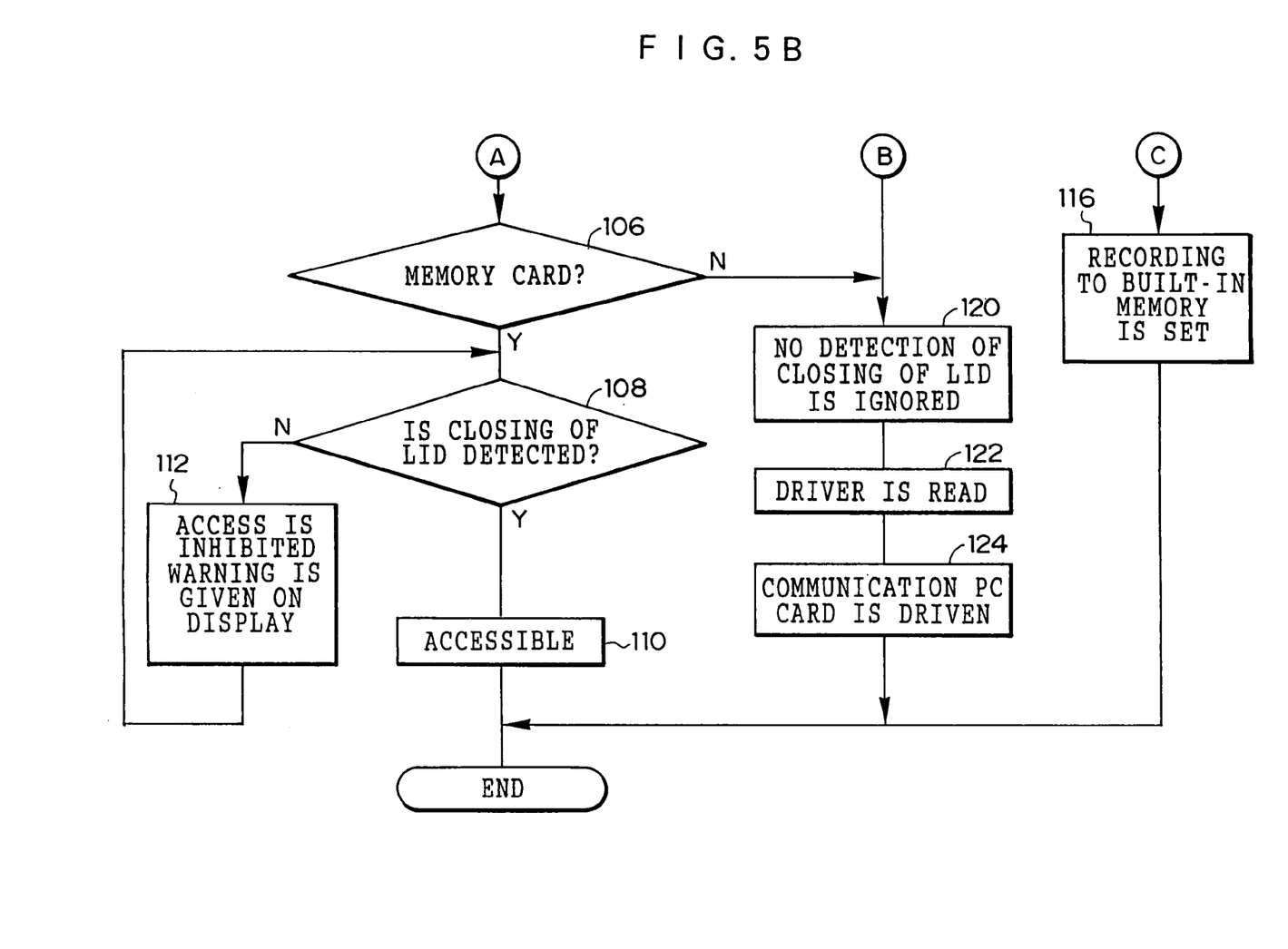

Next, a description will be given of control of the digital camera by the control section 22 with reference to the flow chart shown in FIG. 5. There will be described herein a case in which the lid can be closed when the memory card 18 is inserted in the slot, and the lid cannot be closed when the communication PC card 17 is inserted in the slot.

First, in step 100, it is determined whether a power source is turned on. When it is determined that the power source is turned on, in the subsequent step 102, it is determined whether a card is inserted in the slot 23.

When it is determined that a card is inserted in the slot 23, the process proceeds to step 104 in which access to the inserted card is carried out and a configuration of a system area is read. Subsequently, in step 106, it is determined whether the inserted card is the memory card 18.

When in step 106 it is determined that the inserted card is not the memory card 18, the process proceeds to step 120, which will be described later. When it is determined that the inserted card is the memory card 18, the process proceeds to step 108 in which it is determined whether an electric signal is outputted from the open/close-state detecting sensor 29a to the detecting section 32.

When the electric signal is not outputted to the detecting section 32, the lid is in an open state. Therefore, the process proceeds to step 112 in which access to the memory card 18 is inhibited and a warning is given to the display. Subsequently, the process returns to step 108 in which it is determined whether the electric signal is outputted from the open/close-state detecting sensor 29a to the detecting section 32. When it is determined that the electric signal is outputted to the detecting section 32, communication access to the memory card 18 is enabled (that is, a driver (processing program) of the memory card 18 is read) in step 110, and the routine ends.

On the other hand, when in step 102 it is determined that the card is not inserted in the slot 23, the process proceeds to step 114 in which it is determined whether the electric signal is outputted from the open/close-state detecting sensor 29a to the detecting section 32.

When in step 114 it is determined that the electric signal is outputted to the detecting section 32, in step 116, recording of image data is carried out to built-in memory, and thereafter, the routine ends. Further, when in step 114 it is determined that the electric signal is not outputted to the detecting section 32, the process proceeds to step 118 in which it is determined whether a lid accommodation detecting signal is outputted from the accommodation detecting sensor 29b to the detecting section 32.

When in step 118 it is determined that the lid accommodation detecting signal is not outputted from the accommodation detecting sensor 29b to the detecting section 32, the process returns to step 102 and the above-described processing is repeatedly executed. Further, when it is determined that the lid accommodation detecting signal is outputted from the accommodation detecting sensor 29b to the detecting section 32, a determination is made that the communication PC card is inserted in the slot. Subsequently, the process proceeds to step 120 in which setting is made so that no detection of closing of the lid is ignored even when no electric signal is outputted. Subsequently, in step 122, a driver for the communication PC card 17 is read. In step 124, access to the communication PC card 17 is achieved and the communication PC card 17 is driven. Thereafter, the routine ends.

As described above, in the second embodiment, if the card inserted in the slot is the memory card 18, the lid 28b is closed and removal of the memory card 18 is inhibited during communication access to the memory card 18. Further, if the card inserted in the slot is the communication PC card 17, the communication PC card 17 is adapted to be usable even if the lid 28b is not closed and accommodated in the accommodating groove 37. That is, electrical setting is altered in accordance with the kind of a card inserted in the slot 23, and therefore, a state in which the inserted card is inaccessible for communication due to the lid 28b, can be prevented.

Further, electrical control adapted to an opening or closing state of the lid 28b is determined in such a manner that: when the card is inserted in the slot 23 after the power source is turned on and when the card is not inserted in the slot 23, an opening or closing state of the lid 28b is detected; if the lid 28b is not opened, image data is set so as to be stored to built-in memory; and if the lid 28b is opened and is thereafter accommodated in the accommodating groove 37, it is determined that the inserted card is the communication PC card 37, and the driver for the communication PC card 37 is immediately read. Therefore, there is an advantage in that processing speed increases.

Moreover, there is also an advantage in that since various kinds of recording media or communication media can be mounted in an image-capturing apparatus in a replaceable manner, complete functions for the digital camera are enabled.

When accommodation of a lid member in an accommodating portion is detected, if an instruction for removal of the memory card is given, communication access is forcedly brought to an end or a warning is given, such as activating a buzzer. When a state is detected in which the opening of the slot is covered by the lid member, even if an instruction for removal of the memory card is given, the instruction is ignored or removal processing is carried out after access ends. Thus, electrical control of the digital camera can be altered in accordance with the state of the lid member.

In the second embodiment, the second member 34b is formed as a flat plate, but may be formed of an elastic or deformable material such as rubber, resin, or a bellows configuration. Further, in the second embodiment, a structure is provided in which the first member 34a slides within the accommodating groove 37 and the second member 34b is accommodated in the accommodating groove 37. However, the present invention is not limited to this structure. For example, a structure in which an elastic cover member is provided at the bottom of the accommodating portion 37 and the slot 23 is covered by the cover member in an extended state.

According to the above-described structure, when a covering for the slot by the cover member is removed, the cover member may be adapted to be accommodated in the accommodating groove 37 due to restoring force of the cover member itself. Naturally, the cover member can also be manually re-accommodated in the accommodating groove 37 by a user.

Third Embodiment

Next, a third embodiment of the present invention will be described in detail with reference to FIGS. 6 and 7. A digital camera according to the third embodiment has almost the same structure as that of the digital camera of the first embodiment, and therefore, only different parts will be described.

The digital camera of the third embodiment is different from that of the first embodiment in the lid of the receptacle or slot 23. As shown in FIGS. 6A and 6B, the lid is divided into a plurality of portions, for example, three portions in the present embodiment, which each independently effect an opening or closing operation.

That is, a lid 28c of the third embodiment is formed by a first door portion 50a for covering one end of the slot 23, a second door portion 50b for covering a central portion of the slot 23, and a third door portion 50c for covering another end of the slot 23.

Figure 6A:
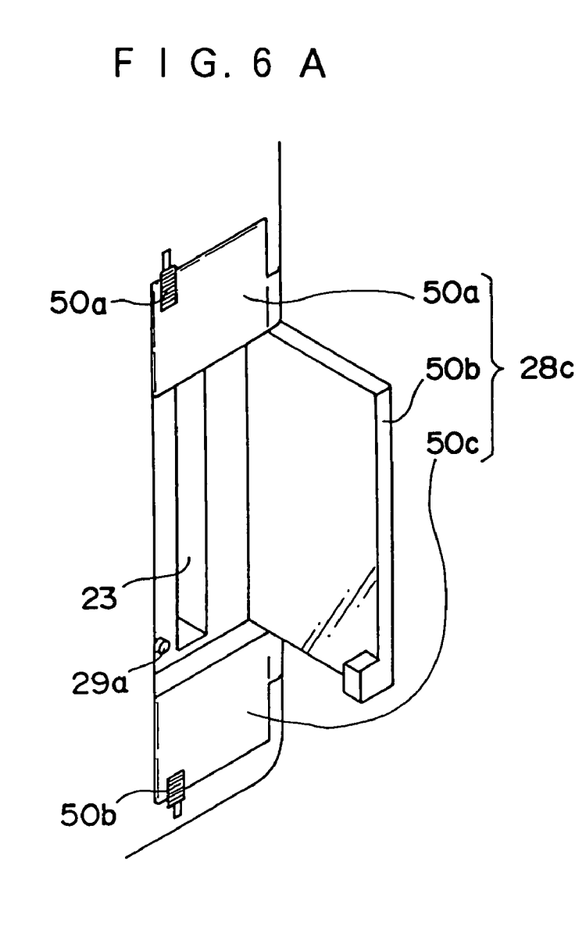
FIG. 6A is an illustrative view showing a state in which the lid is opened.
Figure 6B:
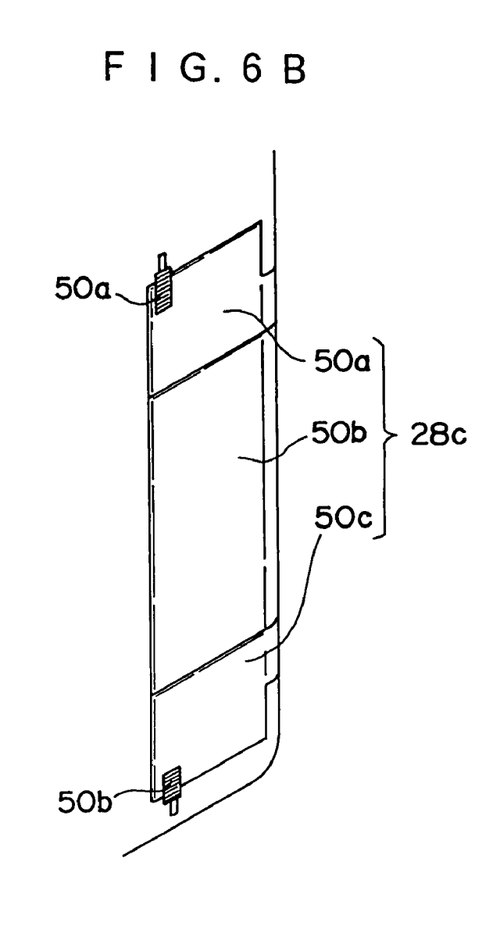
FIG. 6B is an illustrative view showing a state in which the lid is closed.
Figure 7A:
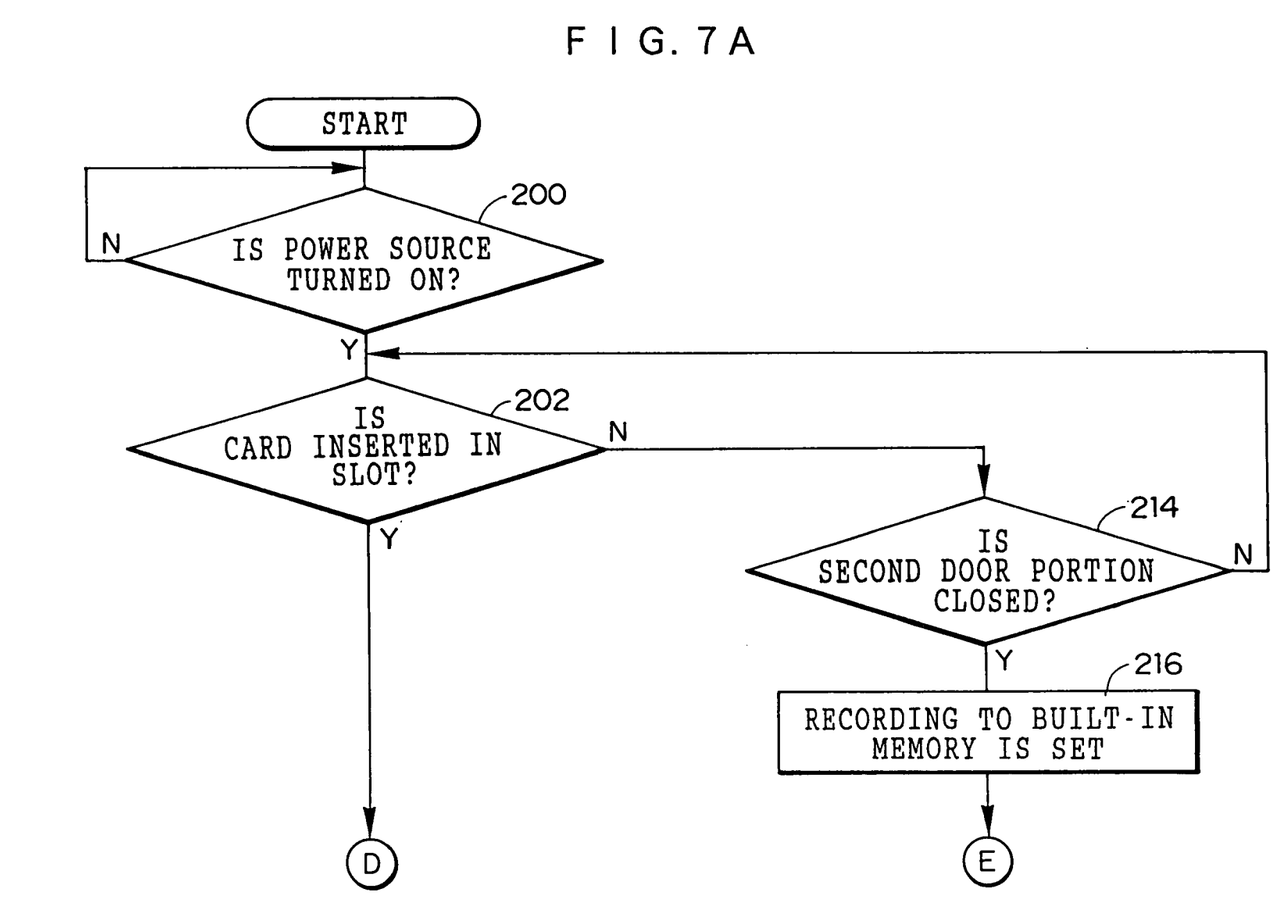
FIGS. 7A and 7B are flow charts showing control logic in a control section of the digital camera shown in FIGS. 6A and 6B.
Figure 7B:
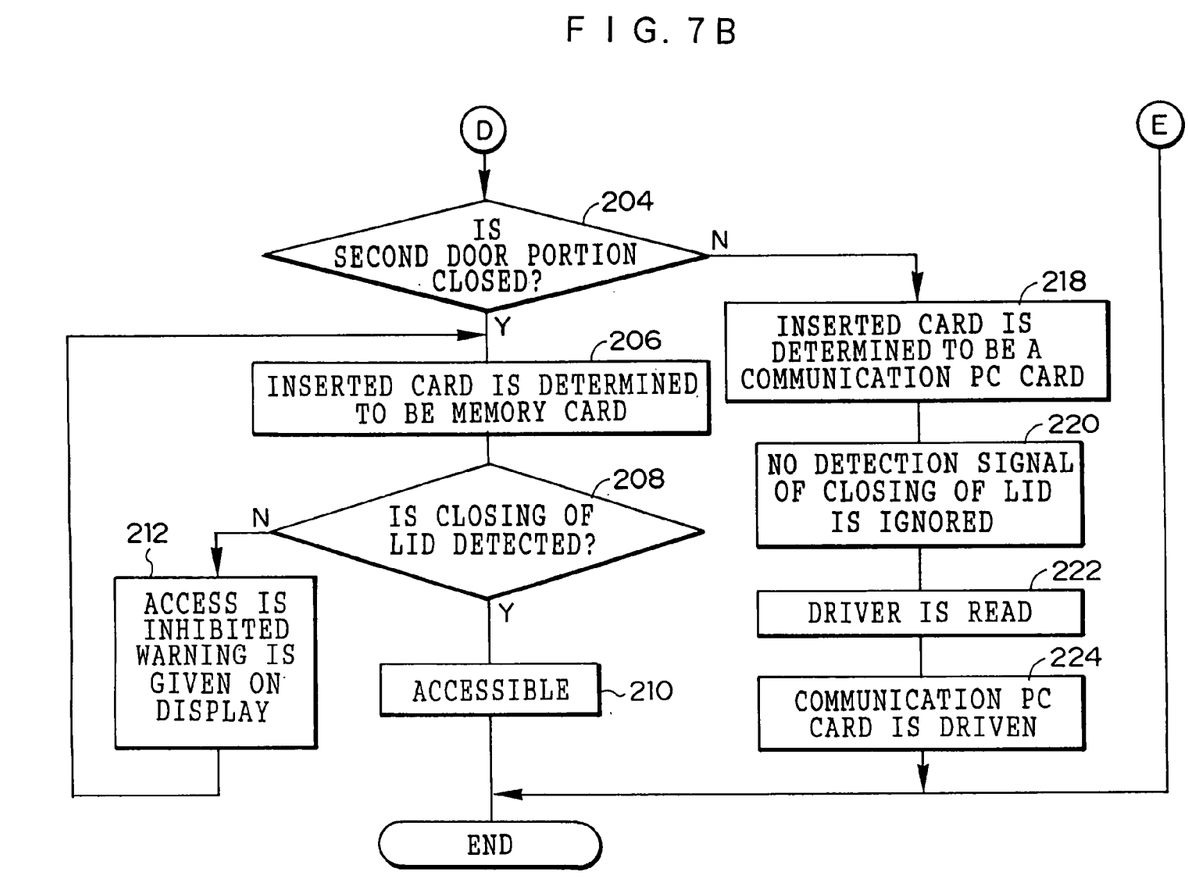

As is shown in FIG. 6A, the second door portion 50b at the central position is provided at a position which corresponds to a connector portion of the connection cable 13 protruding from the slot 233 when the communication PC card 17 is inserted in the slot. The first door portion 50a and the third door portion 50c are provided so as to cover open regions at both sides of the second door portion 50b. Further, the first door portion 50a and the third door portion 50c are provided with slide type locks 52a and 52b respectively, and can be held in a closed state in such a manner that the locks 52a and 52b are slid by a user.

Further, the open/close-state detecting sensor 29a is disposed at the side of the slot 23 opposite to the side at which the lid 28c is provided, and at a position in the vicinity of the slot 23 where it is pushed down by a convex portion formed in the second door portion 50b when the second door portion 50b swings to cover the opening of the slot 23. The open/close-state detecting sensor 29a is, in the same way as in the second embodiment, pushed by the convex portion and turned on, and outputs an electric signal to the detecting section 32.

Next, a description will be given of read-out control of the digital camera by the control section 22 with reference to the flow chart shown in FIGS. 7A and 7B. There will be herein described a case in which the first door portion 50a, the second door portion 50b, and the third door portion 50c can all be closed when the memory card 18 is inserted in the slot, and the second door portion 50b cannot be closed when the communication PC card 17 is inserted.

First, in step 200, it is determined whether a power source is turned on. When it is determined that the power source is turned on, in step 202, it is determined whether a card is inserted in the slot 23.

When it is determined that no card is inserted in the slot 23, the process proceeds to step 214 in which an electric signal is outputted from the open/close-state detecting sensor 29a to the detecting section 32 and a determination is made based thereon as to whether the second door portion 50b is closed.

When the second door portion 50b is not closed, the process returns to step 202 and the above-described processing is executed repeatedly. On the other hand, when the second door portion 50b is closed, the process proceeds to step 216 in which a setting is made so that recording of image data is carried out to built-in memory, and thereafter, the routine ends.

When in step 202 it is determined that a card is inserted in the slot, the process proceeds to step 204 in which an electric signal is outputted from the open/close-state detecting sensor 29a to the detecting section 32 and a determination is made based thereon as to whether the second door portion 50b is closed.

When the second door portion 50b is closed, in step 206, it is determined that the card inserted in the slot 23 is the memory card 18. In the subsequent step 208, it is determined whether the three door portions are all closed. The first door portion 50a and the third door portion 50c are each provided with the same open/close-state detecting sensor (not shown) as that of the second door portion 50b, and when a lid closure signal is outputted from each of the all open/close-state detecting sensors, it can be determined that the three door portions are all closed.

When in step 208 it is determined that all of the three door portions cannot be closed, the process proceeds to step 212 in which communication access to the memory card 18 is inhibited and a warning is given to the display. Thereafter, the process returns to step 208 in which it is determined whether the three door portions are all closed. When in step 208 it is determined that the three door portions are all closed, in step 210 the memory card 18 is made accessible for communication (a driver (processing program) of the memory card 18 is read out), and the routine ends.

On the other hand, when in step 204 it is determined that the second door portion 50b is not closed, in step 218, it is determined that the card inserted in the slot is the communication PC card. The process proceeds to step 220 in which a setting is made so that lack of detection of a lid closure signal is ignored even if no electric signal is outputted. In the subsequent step 222, a driver (processing program) of the communication PC card 17 is read out. In the subsequent step 224, the communication PC card is made accessible and is driven, and the routine ends.

As described above, in the third embodiment, the lid 28c for covering the slot 23 is formed by three door portions, and therefore, an open/close state of the lid 28c can be partially altered in such a manner that a door portion at a position corresponding to a protruding portion of the card inserted in the slot 23 is opened, and other door portions are closed.

Accordingly, when the card is inserted in the slot 23, the kind of the card inserted in the slot is determined based on an opening or closing state of the second door portion 50b provided at a position corresponding to the connector portion of the connection cable 13, and electrical control can be determined in accordance with the kind of card determined to have been inserted. Thus, electrical processing speed can be increased.

Further, there is also an advantage in that the above-described structure can be applied to various communication PC cards or memory cards, which have different positions at which respective connectors are provided.

In the first, second, and third embodiments, there was described the case in which when the memory card 18 is inserted in the slot, the lid can be closed, and when the communication PC card 17 is inserted in the slot, the lid cannot be closed. However, the present invention is not limited to the same. For example, the present invention can also be applied to a case in which when the first kind of memory card is inserted in the slot, the lid can be closed, and when the second kind of memory card is inserted, the lid cannot be closed, or a case in which when the first kind of communication PC card is inserted, a portion of the card protruding from the slot corresponds to a central portion of the lid, and when the second type of communication PC card is inserted, a portion of the card protruding from the slot corresponds to an end of the lid, that is, a case in which cards in which portions thereof protruding from the slot correspond to different positions on the lid are respectively inserted.

Further, in the above-described first, second, and third embodiments, there was described a structure in which a single receptacle or slot is provided in the digital camera. However, the present invention is not limited to the structure having a single slot, and is also applicable to lids for a plurality of receptacles or slots, for example, two slots provided in the digital camera.

In this case, one of the two slots may be used for reading a recording medium and another slot may be used for insertion of a communication PC card, or both or one of the two slots can be provided so as to be capable of executing both reading of a recording medium and driving the communication PC card. In the structure in which two slots are formed, both of the recording medium and the communication PC card can be simultaneously inserted in the digital camera, and therefore, a structure having no built-in memory can also be provided.

In the digital cameras of the above-described embodiments, a slot is used which corresponds to media having an elongated configuration. However, the present invention is not limited to the same. For example, the present invention may also be applied to a case in which a receptacle is used which corresponds to media of different shapes (for example, cross sections thereof are elliptical or circular).

What is claimed is:

1. An image-capturing apparatus comprising a housing supporting lenses and an image reading element disposed for reading an image formed by the lenses and producing image data in accordance therewith for image recording, the housing including:
    a receptacle in which a first medium having a size which can be accommodated therein, and a second medium which can be inserted therein and of which portion protrudes from the receptacle when inserted, can be selectively inserted; and
    a lid member provided in a state of freely opening and closing so as to cover an opening of said receptacle, said lid member having a notch in which said portion of the second medium is inserted to pass when said lid member is closed in a state in which the second medium is inserted in said receptacle,
    wherein the first medium includes an engaging portion which engages with the notch in a state in which said lid member is closed.

2. An image-capturing apparatus according to claim 1, further comprising a covering member for covering the notch.

3. An image-capturing apparatus according to claim 1, further comprising a detector which detects an open/close state of said lid member,
    wherein when a closed state of said lid member is detected by said detector, any one of the first medium and the second medium is made accessible, and when an open state of said lid member is detected by said detector, the first medium and the second medium are either made inaccessible.

4. An image-capturing apparatus according to claim 1, further comprising a plurality of receptacles, wherein said lid member is provided for each of the receptacles.

5. An image-capturing apparatus according to claim 1, wherein the first medium is a recording medium on which the image data is recorded, and the second medium is a communication medium provided for communication of the image data.

6. An image-capturing apparatus comprising a housing supporting lenses and an image reading element disposed for reading an image formed by the lenses and producing image data in accordance therewith for image recording, the housing including:
    a receptacle in which a first medium having a size which can be accommodated therein, and a second medium which can be inserted therein and of which portion protrudes from the receptacle when inserted, can be selectively inserted;
    a lid member provided in a state of freely opening and closing so as to cover an opening of said receptacle, said lid member having a notch in which said portion of the second medium is inserted to pass when said lid member is closed in a state in which the second medium is inserted in said receptacle; and
    an engaging member which can be mounted at the first medium and engages with the notch in a state in which said lid member is closed.

7. An image-capturing apparatus according to claim 6, wherein said engaging member can be mounted in the image-capturing apparatus so as to cover the opening of said receptacle in a state in which the engaging member is removed from the first medium.

8. An image-capturing apparatus in which an image formed by lenses is read by an image reading element and is recorded as image data, comprising:
    a receptacle in which a first medium having a size which can be accommodated therein, and a second medium which can be inserted therein and of which portion protrudes from the receptacle when inserted, can be selectively inserted;
    a lid member formed by a plurality of door portions which are each formed so as to be capable of opening and closing independently, and provided so as to cover an opening of said receptacle when the plurality of door portions are closed; and
    a detector which detects an open/close state of each of the plurality of door portions,
    wherein a determination is made, based on an open/close state of each of the plurality of door portions detected by said detector, as to whether the first medium or the second medium is accommodated, and based on the determined result, the first medium or the second medium, which is accommodated, is made accessible.

9. An image-capturing apparatus according to claim 8, further comprising a lock mechanism for holding a closed state of each of the plurality of door portions.

10. An image-capturing apparatus according to claim 8, further comprising a plurality of receptacles, wherein said lid member is provided for each of the receptacles.

11. An image-capturing apparatus in which an image formed by lenses is read by an image reading element and is recorded as image data, comprising:
    a receptacle in which a first medium having a size which can be accommodated therein, and a second medium which can be inserted therein and of which portion protrudes from the receptacle when inserted, can be selectively inserted; and
    a lid member disposed so as to cover an opening of said receptacle, said lid member being provided which can be accommodated in an accommodating portion formed in a main body of the image-capturing apparatus along said receptacle,
    wherein said lid member is operable to cover the opening of said receptacle when said second medium is inserted, and
    wherein said lid member is a cover member accommodated in the accommodating portion, and the opening of said receptacle is covered by the cover member made into an extended state.

12. An image-capturing apparatus according to claim 11, further comprising a detector which detects an open/close state of said lid member,
    wherein based on the state of said lid member detected by said detector, it is determined whether the second medium is inserted.

13. An image-capturing apparatus according to claim 11, wherein when the extended state of the cover member is released, the cover member is accommodated in the accommodating portion.

14. An image-capturing apparatus according to claim 11, further comprising a plurality of receptacles, wherein said lid member is provided for each of the receptacles.

15. The image-capturing apparatus according to claim 11, wherein said lid member does not protrude from said main body of the image-capturing apparatus when accommodated in the accommodating portion.

16. The image capturing apparatus according to claim 11, wherein said receptacle is disposed within a main housing such that said first medium and said second medium are substantially accommodated within said main housing.

17. The image capturing apparatus according to claim 11, wherein each of said first medium and said second medium is accommodated to be substantially disposed within said receptacle.

18. An image-capturing apparatus in which an image formed by lenses is read by an image reading element and is recorded as image data, comprising:
   a receptacle in which a first medium having a size which can be accommodated therein, and a second medium which can be inserted therein and of which portion protrudes from the receptacle when inserted, can be selectively inserted; and
   a lid member disposed so as to cover an opening of said receptacle, said lid member being provided which can be accommodated in an accommodating portion formed in a main body of the image-capturing apparatus along said receptacle,
   wherein said lid member is operable to cover the opening of said receptacle when said second medium is inserted, and
   wherein said lid member is formed by a first member and a second member, which are slidably accommodated in the accommodating portion, the second member being provided in the first member in a swingable manner, and when the second member swings in a state in which the first member is accommodated in the accommodating portion and the second member protrudes from the accommodating portion, the second member covers the opening of said receptacle.

19. An image-capturing apparatus according to claim 18, wherein the second member is formed of an elastic or deformable material.

20. An image-capturing apparatus in which an image formed by lenses is read by an image reading element and is recorded as image data, comprising:
   a receptacle in which a first medium having a size which can be accommodated therein, and a second medium which can be inserted therein and of which portion protrudes from the receptacle when inserted, can be selectively inserted;
   a lid member disposed so as to cover an opening of said receptacle, said lid member being provided which can be accommodated in an accommodating portion formed in a main body of the image-capturing apparatus along said receptacle; and
   a detector which detects an open/close state of said lid member,
   wherein said lid member is operable to cover the opening of said receptacle when said second medium is inserted,
   wherein based on the state of said lid member detected by said detector, it is determined whether the second medium is inserted,
   wherein said detector further detects as to whether said lid member is accommodated in the accommodating portion, and
   when a closed state of said lid member is detected by said detector, the first medium is made accessible, and when a state in which said lid member is accommodated in the accommodating portion is detected by said detector, the second medium is made accessible.

* * * * *